US008775070B1

(12) United States Patent
Bhatia

(10) Patent No.: US 8,775,070 B1
(45) Date of Patent: Jul. 8, 2014

(54) METHOD AND SYSTEM FOR USER PREFERENCE-BASED ROUTE CALCULATION

(75) Inventor: Sandeep Bhatia, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 1389 days.

(21) Appl. No.: 12/251,655

(22) Filed: Oct. 15, 2008

(51) Int. Cl.
*G01C 21/34* (2006.01)

(52) U.S. Cl.
CPC ................................. *G01C 21/3461* (2013.01)
USPC ........................................................ 701/425

(58) Field of Classification Search
CPC .................. G06F 17/30241; G06F 17/300032; G06F 17/30342; G06F 3/167; G06F 3/0484; G01C 21/343; G01C 21/3461
USPC ........... 701/200–216, 400–444; 341/998–996
See application file for complete search history.

(56) References Cited

U.S. PATENT DOCUMENTS

| | | | | |
|---|---|---|---|---|
| 5,262,775 A * | 11/1993 | Tamai et al. | ............. | 340/995.21 |
| 5,742,922 A * | 4/1998 | Kim | ............... | 701/201 |
| 7,266,447 B2 * | 9/2007 | Bauer et al. | ............. | 701/423 |
| 2003/0229441 A1 * | 12/2003 | Pechatnikov et al. | ......... | 701/201 |
| 2006/0265294 A1 * | 11/2006 | de Sylva | ......... | 705/28 |

OTHER PUBLICATIONS

"Audible Street Signals are Barriers to the Blind"; by Gary Mackenstadt; Future Reflections May/Jun. 1983, vol. 2. No. 3.*
"Why Bicyclists Hate Stop Signs"; by Joel Fajans and Melanie Curry; Access No. 18 Spring 2001.*

* cited by examiner

*Primary Examiner* — Minnah Seoh
(74) *Attorney, Agent, or Firm* — Hawley Troxell Ennis & Hawley LLP; Philip McKay

(57) ABSTRACT

A method and system for providing user preference based route calculation whereby criteria based digital map data associated with one or more user criteria is generated and/or obtained. When a user makes a request for a map and/or directions from a first point to a second point that includes one or more user route criteria, the criteria based digital map data is searched based, at least in part, on the one or more user route criteria and one or more potential routes are determined that most closely match the one or more user route criteria. One or more user criteria based maps and/or sets of directions are then generated associated with the one or more potential routes that most closely match the one or more user route criteria. Data representing the one or more user criteria based maps and/or sets of directions is then provided to the user.

30 Claims, 2 Drawing Sheets

METHOD AND SYSTEM FOR USER PREFERENCE-BASED ROUTE CALCULATION

BACKGROUND

Currently, several computing system implemented map and route calculation systems are available to consumers. Initially, computing system implemented map and route calculation systems were largely desktop-based services such as "Yahoo Maps" that required both a traditional computing system, as well as an Internet connection. However, more recently, vehicle mounted and/or portable navigation systems have become available, many of which integrate wireless network capabilities and/or a GPS function to provide relatively precise point-to-point directions and/or highly localized maps.

Over the past decade, more and more consumers have come to rely on these computing system implemented map and route calculation systems for obtaining the majority of their maps and directions. As a result many vehicles now come from the factory equipped with a computing system implemented map and route calculation system. In addition, many consumer electronic devices, such as cellular telephones, now also include a computing system implemented map and route calculation feature.

While the capabilities of current computing system implemented map and route calculation systems are impressive, currently available computing system implemented map and route calculation systems provide the user very limited ability to designate route preferences. For instance, using currently available computing system implemented map and route calculation systems, the user has little opportunity to customize the suggested route to take into account secondary, but often very significant, route considerations such as the most fuel efficient route, routes having the most, or the least, right or left hand turns, routes having the most, or the least, stoplights and/or stop signs, routes avoiding or incorporating designated business routes, routes avoiding or incorporating stop signs as opposed to traffic lights, routes having specified speed limits, routes having a specified number of traffic lanes, routes avoiding or incorporating, major metropolitan areas, routes avoiding, or incorporating, specified changes in elevation, etc.

As a result of this limited preference input capability of currently available computing system implemented map and route calculation systems, many opportunities to save fuel and/or time are missed by the average user, and the user is denied the opportunity to choose a route that is best suited to the user's needs, and/or which would potentially result in the most pleasant travel experience for the user.

SUMMARY

In accordance with one embodiment, a method and system for providing user preference based route calculation includes a process for providing user preference based route calculation whereby, in one embodiment, criteria based digital map data is generated and/or obtained. In one embodiment, the criteria based digital map data includes, but is not limited to, data associated with one or more user criteria that are offered to the user by the process for providing user preference based route calculation as user selectable route preferences. In one embodiment, the criteria based digital map data is stored in a digital map data database. In one embodiment, a user makes a request for a map and/or directions from a first point to a second point. In one embodiment, the user request for a map and/or directions also includes one or more user route criteria. In one embodiment, the criteria based digital map data is searched based, at least in part, on the one or more user route criteria and one or more potential routes are determined that most closely match the one or more user route criteria. In one embodiment, one or more user criteria based maps and/or sets of directions are generated associated with the one or more potential routes that most closely match the one or more user route criteria. In one embodiment, data representing the one or more user criteria based maps and/or sets of directions is then provided to the user.

In one embodiment, the criteria based digital map data is generated and/or obtained using any one or several processes, mechanisms, and/or sources, as discussed herein, and/or known in the art at the time of filing, and/or as developed after the time of filing. For instance, in one embodiment, the criteria based digital map data is obtained by human/field observation and/or data gathering and then entered into a computing system using a user interface device. In one embodiment, the criteria based digital map data is obtained from printed materials, such as a traditional map, and then entered into a computing system using a user interface device and/or a scanning device. In one embodiment, the criteria based digital map data is obtained from existing map data already in a digital format. In other embodiments, the criteria based digital map data is obtained from any source of criteria based digital map data as discussed herein, and/or known in the art at the time of filing, and/or as developed after the time of filing.

In one embodiment the criteria based digital map data includes, but is not limited to, data associated with one or more user criteria that are offered to the user by the process for providing user preference based route calculation as user selectable route preferences. Consequently, in one embodiment, the criteria based digital map data includes data indicating, but not limited to, one or more of the following: the number or right or left turns; designated business routes; stop signs and/or traffic lights; designated right and/or left turn lanes and traffic lights; speed limits; number of traffic lanes; major metropolitan areas; changes in elevation; and/or any other criteria based digital map data.

In one embodiment, the criteria based digital map data is stored in a digital map data database that is local, remote, or a combination of local and remote. In one embodiment, the criteria based digital map data is stored in a digital map data database that is a memory associated with, that is part of, or is accessible by, one or more computing system implemented map and route calculation systems. In one embodiment, the digital map data database is a data storage device, such as database, a server system, a computing system, a designated portion of one or more server systems or computing systems, or a distributed database, or an external and/or portable hard drive, or any combination thereof, that is local, remote, or a combination of local and remote. In one embodiment, the digital map data database is a dedicated mass storage device implemented in software, hardware, or a combination of hardware and software. In one embodiment, the digital map data database includes a web-based function accessible through a private and/or public network. In one embodiment, the digital map data database is accessible through a private and/or public network, and/or an Internet connection. In one embodiment, the digital map data database is accessible through a wireless connection and/or network.

In one embodiment, a user makes a request for a map and/or directions from a first point to a second point. In one embodiment, the user makes the request for a map and/or directions from a first point to a second point using a user interface device such as a keyboard, mouse, touch pad, voice recognition software, or any other means and/or mechanism for converting user actions into computing system processes and/or otherwise entering data into a computing system implementing at least part of the process for providing user preference based route calculation.

In one embodiment, the user request for a map and/or directions also includes one or more user route criteria. In one embodiment, the one or more user route criteria include, but are not limited to, any of the following: the most fuel efficient route, or a green route; the routes with most right or left hand turns and/or the routes with the least right or left hand turns; routes avoiding, or incorporating, designated business routes; routes avoiding, or incorporating, stop signs as opposed to traffic lights; routes having specified speed limits; routes having a specified number of traffic lanes; routes avoiding, or incorporating, major metropolitan areas; routes avoiding, or incorporating, specified changes in elevation; and/or any other route criteria of interest to the user.

In one embodiment, in response to the user request for a map and/or directions from a first point to a second point including the one or more user route criteria, the criteria based digital map data is searched based, at least in part, on the one or more user route criteria. In one embodiment, the search of the criteria based digital map data is performed using any one of several search mechanisms, programs, procedures, and/or algorithms as described herein, and/or known in the art at the time of filing, and/or as developed after the time of filing.

In one embodiment, based on the search of the criteria based digital map data, one or more potential routes are determined that most closely match the one or more user route criteria.

In one embodiment, using the one or more potential routes that most closely match the one or more user route criteria, one or more user criteria based maps and/or sets of directions are generated associated with the one or more potential routes that most closely match the one or more user route criteria. In one embodiment, two or more potential routes that most closely match the one or more user route criteria are generated along with supporting data indicating how closely each route matches the one or more user route criteria. In one embodiment, two or more potential routes that most closely match the one or more user route criteria are ranked according to how closely each route matches the one or more user route criteria.

In one embodiment, data representing the one or more user criteria based maps and/or sets of directions, and/or any supporting data, is then provided to the user.

In one embodiment, the data representing the one or more user criteria based maps and/or sets of directions is provided to the user through one or more computing system implemented map and route calculation systems. In one embodiment, the data representing the one or more user criteria based maps and/or sets of directions is provided to the user by providing the user access to the data in a data storage device, such as database, a server system, a computing system, a designated portion of one or more server systems or computing systems, or a distributed database, or an external and/or portable hard drive, or any combination thereof, that is local, remote, or a combination of local and remote. In one embodiment, the data representing the one or more user criteria based maps and/or sets of directions is provided to the user through software, hardware, or a combination of hardware and software. In one embodiment, the data representing the one or more user criteria based maps and/or sets of directions is provided to the user using a computer program product, as defined herein. In one embodiment, the data representing the one or more user criteria based maps and/or sets of directions is provided to the user through a web-based function accessible through a private and/or public network. In one embodiment, the data representing the one or more user criteria based maps and/or sets of directions is provided to the user through a private and/or public network, and/or an Internet connection. In one embodiment, the data representing the one or more user criteria based maps and/or sets of directions is provided to the user through a wireless network.

Using the method and system for providing user preference based route calculation, as disclosed herein, the capabilities of computing system implemented map and route calculation systems is greatly increased as the user is provided significant ability to designate route preferences. For instance, using the method and system for providing user preference based route calculation, as disclosed herein, the user has the opportunity to customize the suggested route to include secondary, but often very significant, route considerations such as the most fuel efficient route, routes avoiding or incorporating designated business routes, routes avoiding or incorporating stop signs as opposed to traffic lights, routes having specified speed limits, routes having a specified number of traffic lanes, routes avoiding or incorporating, major metropolitan areas, routes avoiding, or incorporating, specified changes in elevation, etc. Consequently, using the method and system for providing user preference based route calculation disclosed herein, the user is presented numerous opportunities to save fuel and/or time and the opportunity to choose a route that is best suited to the user's needs, and which would result in the most pleasant travel experience for the user.

As discussed in more detail below, using the below embodiments, with little or no modification and/or user input, there is considerable flexibility, adaptability, and opportunity for customization to meet the specific needs of various users under numerous circumstances.

Figure 1:
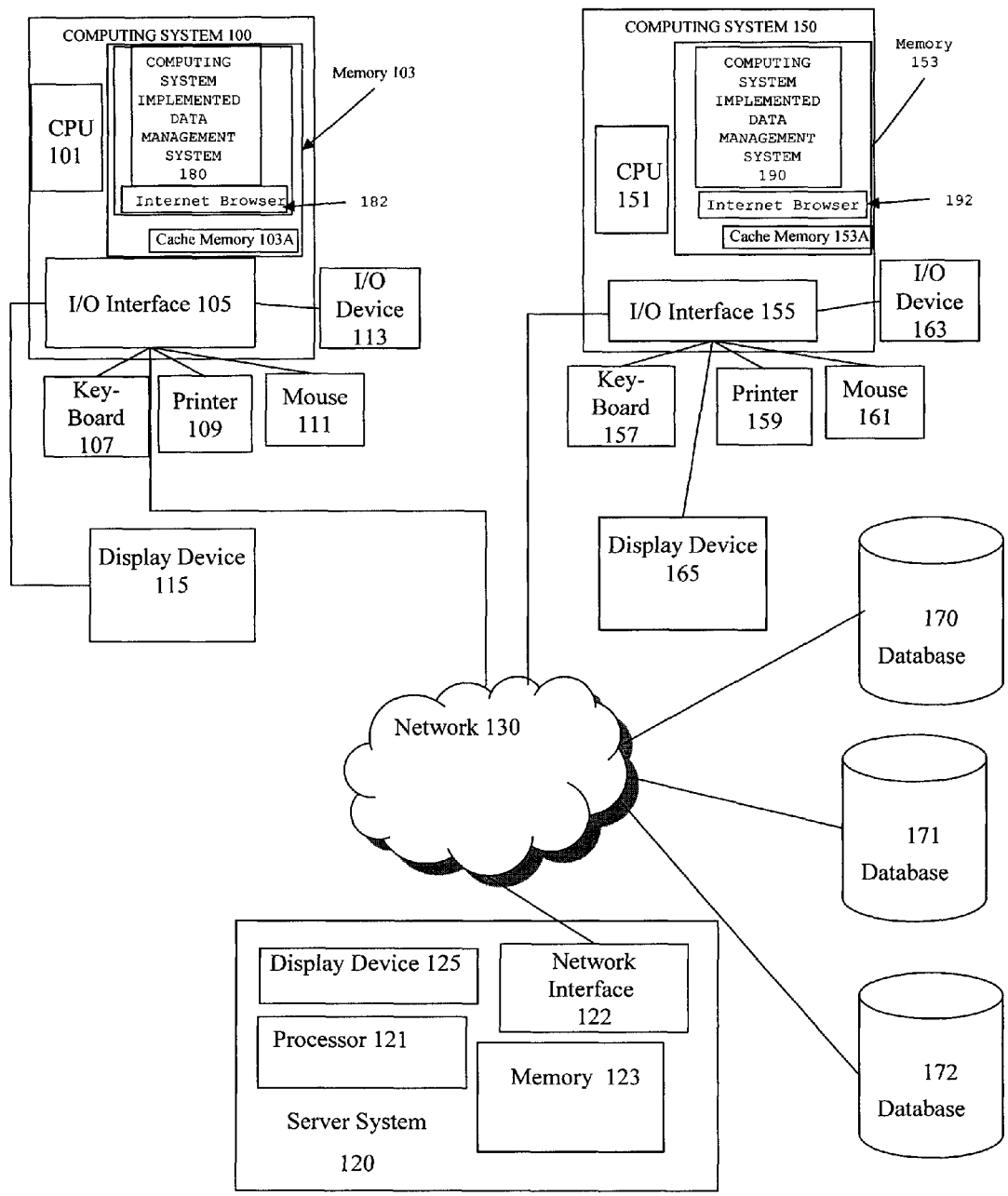
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims below.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for providing user preference based route calculation includes a process for providing user preference based route calculation whereby, in one embodiment, criteria based digital map data is generated and/or obtained. In one embodiment, the criteria based digital map data includes, but is not limited to, data associated with one or more user criteria that are offered to the user by the process for providing user preference based route calculation as user selectable route preferences. In one embodiment, the criteria based digital map data is stored in a digital map data database. In one embodiment, a user makes a request for a map and/or directions from a first point to a second point. In one embodiment, the user request for a map and/or directions also includes one or more user route criteria. In one embodiment, the criteria based digital map data is searched based, at least in part, on the one or more user route criteria and one or more potential routes are determined that most closely match the one or more user route criteria. In one embodiment, one or more user criteria based maps and/or sets of directions are generated associated with the one or more potential routes that most closely match the one or more user route criteria. In one embodiment, data representing the one or more user criteria based maps and/or sets of directions is then provided to the user.

Hardware System Architecture

FIG. 1 is a block diagram of an exemplary hardware architecture for implementing one embodiment of a system and method for providing user preference based route calculation, such as exemplary process 200 (FIG. 2) discussed herein, that, returning to FIG. 1, includes: a computing system 100, e.g., a first computing system; a computing system 150, e.g., a second computing system; a server system 120; and exemplary databases 170, 171, and/or 172, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part, of a computing system implemented data management system 180, such as any computing system implemented data management system discussed herein, and/or known in the art at the time of filing, and/or as developed thereafter. In one embodiment, computing system implemented data management system 180 is a computing system implemented map and route calculation system, as described herein, and/or known in the art at the time of filing, and/or as developed thereafter. In one embodiment, computing system implemented data management system 180 is stored, in whole, or in part, in memory system 103, and is used by, or includes, or is accessed by, one or more computing system implemented map and route calculation systems, and/or a process for providing user preference based route calculation.

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. In one embodiment, a process for providing user preference based route calculation and/or a computing system implemented data management system are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

In one embodiment, computing system 100 is used by, or includes, or is accessed by, one or more computing system implemented map and route calculation systems and memory system 103 includes all, or part, of data representing digital map data and/or criteria based digital map data with which the computing system implemented map and route calculation systems interact. In one embodiment, computing system 100 is a computing system accessible by one or more users. In one embodiment, computing system 100 is a computing system accessible by a process for providing user preference based route calculation. In one embodiment, computing system 100 is used, and/or accessible, by another computing system, such as computing system 150 (discussed below).

Computing system 100 can be any computing system as defined herein and/or as known in the art at the time of filing and/or as developed thereafter, that includes components that can execute all, or part, of a process for providing user preference based route calculation, and/or a computing system implemented data management system, in accordance with at least one of the embodiments as described herein. In one embodiment, computing system 100 can be a computing system implemented map and route calculation system or a device including a computing system implemented map and route calculation system capability, such as a cell phone or PDA.

Similarly, computing system 150 typically includes a CPU 151, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

In one embodiment, computing system 150 also includes an Internet browser capability 192 that, in one embodiment, includes a search engine (not shown) and is stored, in whole, or in part in memory 153.

In one embodiment, memory system 153 includes all, or part, of a computing system implemented data management system 190, such as any computing system implemented data management system defined herein, known in the art at the time of filing, and/or as developed thereafter. In one embodiment, computing system implemented data management system 190 is stored, in whole, or in part, in memory system 153, and is used by, or includes, or is accessed by, a process for providing user preference based route calculation.

In one embodiment, computing system 150 is used by, or includes, or is accessed by, one or more computing system implemented map and route calculation systems and memory system 153 includes all, or part, of data representing digital map data and/or criteria based digital map data with which the computing system implemented map and route calculation systems interact. In one embodiment, computing system 150 is a computing system accessible by one or more users. In one embodiment, computing system 150 is a computing system accessible by a process for providing user preference based route calculation. In one embodiment, computing system 150 is used, and/or accessible, by another computing system, such as computing system 100.

Computing system 150 can be any computing system as defined herein and/or as known in the art at the time of filing and/or as developed thereafter, that includes components that can execute all, or part, of a process for providing user preference based route calculation, and/or a computing system implemented data management system, in accordance with at least one of the embodiments as described herein. In one embodiment, computing system 150 can be a computing system implemented map and route calculation system or a device including a computing system implemented map and route calculation system capability.

As discussed in more detail below, in one embodiment, all, or part, of a process for providing user preference based route calculation, and/or a computing system implemented data management system, and/or data representing digital map data and/or criteria based digital map data, can be loaded, in whole, or in part, into computing system 150 from computing system 100 for storage in memory system 153 and/or cache memory 153A.

Also shown in FIG. 1 are databases 170, 171, and/or 172. In one embodiment, one or more of databases 170, 171, and/or 172 is a data storage device, a designated server system or computing system, or a designated portion of one or more server systems or computing systems, such as computing systems 100, 150 and server system 120, or a distributed database, or an external and/or portable hard drive. In one embodiment, one or more of databases 170, 171, and/or 172 is a dedicated mass storage device implemented in software, hardware, or a combination of hardware and software. In one embodiment, one or more of databases 170, 171, and/or 172 include a web-based function. As discussed in more detail below, in one embodiment, one or more of databases 170, 171, and/or 172 is under the control of, includes, or is accessed by, one or more computing system implemented map and route calculation systems and one or more of databases 170, 171, and/or 172 includes all, or part, of data representing digital map data and/or criteria based digital map data with which the computing system implemented map and route calculation systems interact. In one embodiment, one or more of databases 170, 171, and/or 172 is a database accessible by one or more users.

In one embodiment, one or more of databases 170, 171, and/or 172 is a digital map database accessible by a process for providing user preference based route calculation and data representing digital map data and/or criteria based digital map data is aggregated and stored in one or more of databases 170, 171, and/or 172 as discussed in more detail below.

In one embodiment, all, or part, of a process for providing user preference based route calculation, and/or a computing system implemented data management system, and/or data representing digital map data and/or criteria based digital map data, is stored in one or more of databases 170, 171, and/or 172, and is used by, or is accessed by, a process for providing user preference based route calculation and/or a provider of and/or a computing system implemented data management system. In one embodiment, one or more of databases 170, 171, and/or 172 is used, and/or accessible, by a computing system, such as computing systems 100 and/or 150, and/or a server system, such as sever system 120 (discussed below). In one embodiment, one or more of databases 170, 171, and/or 172 is used, controlled, and/or accessible by, a provider of and/or a computing system implemented financial management system.

In one embodiment, computing systems 100 and 150, and databases 170, 171, and/or 172, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, all, or part, of a process for providing user preference based route calculation, and/or a computing system implemented data management system, and/or data representing digital map data and/or criteria based digital map data, is stored in server system 120, and is used by, or is accessed by, a process for providing user preference based route calculation. In one embodiment, server system 120 is accessible by one or more computing system implemented map and route calculation systems, and/or a provider of and/or a computing system implemented data management system. In one embodiment, server system 120 is used, and/or accessible, by a computing system, such as computing systems 100 and/or 150, and/or one or more databases, such as databases 170, 171, and/or 172.

Network 130 can be any network or network system as defined herein, and/or known in the art at the time of filing, and/or as developed after the time of filing, capable of allowing communication between two or more computing systems, server systems, and/or databases.

Those of skill in the art will readily recognize that the components shown in FIG. 1, such as computing systems 100 and 150, databases 170, 171, and/or 172, server system 120, and their respective components, are shown for illustrative purposes only and that architectures with more or fewer components can implement, and benefit from, the invention. Moreover, one or more components of computing system 100, computing system 150, databases 170, 171, and/or 172, and server system 120 may be located remotely from their respective system and accessed via network 130. In addition, the particular type of, and configuration of, computing systems 100 and 150, databases 170, 171, and/or 172, and server system 120 are not relevant.

As discussed in more detail below, in one embodiment, all, or part, of a process for providing user preference based route calculation, and/or a computing system implemented data management system, and/or data representing digital map data and/or criteria based digital map data, is stored in memory system 103 and/or cache memory 103A, of computing system 100, and/or memory system 153 and/or cache memory 153A of computing system 150, and/or in server memory system 123 of server system 120, and/or in databases 170, 171, and/or 172, and executed on computing system 100 and/or computing system 150. As used herein, a memory refers to a volatile memory, a non-volatile memory, or any combination of the two.

Although a process for providing user preference based route calculation, and/or a computing system implemented data management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for providing user preference based route calculation and/or a computing system implemented data management system are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or server system processor 121. In one embodiment, execution of a process by CPU 101, CPU 151, or server system processor 121, results in the operations of an agent computer process (not shown) and/or a rule computer process (not shown).

In one embodiment, all, or part, of a process for providing user preference based route calculation, and/or a computing system implemented data management system, and/or data representing digital map data and/or criteria based digital map data, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the terms "user", and/or "consumer", are used interchangeably to denote any person, party, or parties, who interact with, use, or receive information from a process for providing user preference based route calculation, or for whom interaction with a process for providing user preference based route calculation is performed, and/or an authorized agent of any person, party, or parties, who interact with, use, or receive information from a process for providing user preference based route calculation, or for whom interaction with a process for providing user preference based route calculation is performed.

Herein, the terms "global positioning satellite" and "GPS" are used interchangeably.

As used herein, the term "computing system", denotes, but is not limited to: a computing system implemented map and route calculation system; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computing system implemented map and route calculation systems; computers; wireless devices; cellular telephones; digital telephones; two-way pagers; PDAs; media players; server computers; or any desired combination of these devices, that are coupled to perform the processes and/or operations as described herein.

As used herein, the term "computing system implemented data management system" includes, but is not limited to: computing system implemented map and route calculation systems, packages, programs, modules, or applications; computing system implemented personal and small business financial management systems, packages, programs, modules, or applications; computing system implemented business systems, packages, programs, modules, or applications; computing system implemented healthcare management systems, packages, programs, modules, or applications; computing system implemented payroll management systems, packages, programs, modules, or applications; computing system implemented marketing device distribution systems, packages, programs, modules, or applications; computing system implemented financial institution financial management systems, packages, programs, modules, or applications; computing system implemented tax preparation systems, packages, programs, modules, or applications; computing system implemented accounting and/or invoicing systems, packages, programs, modules, or applications; computing system implemented business and/or point of sale systems, packages, programs, modules, or applications; and various other electronic data driven data management systems, packages, programs, modules, or applications, whether known at the time of filling or as developed later.

As used herein, the term "network" is used to denote any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" is used to define any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to data storage means that is part of, or under the control of, any computing system, as defined herein, and/or known at the time of filing, and/or as developed thereafter.

In accordance with one embodiment, a method and system for providing user preference based route calculation includes a process for providing user preference based route calculation whereby, in one embodiment, criteria based digital map data is generated and/or obtained. In one embodiment, the criteria based digital map data includes, but is not limited to, data associated with one or more user criteria that are offered to the user by the process for providing user preference based route calculation as user selectable route preferences. In one embodiment, the criteria based digital map data is stored in a digital map data database. In one embodiment, a user makes a request for a map and/or directions from a first point to a second point. In one embodiment, the user request for a map and/or directions also includes one or more user route criteria. In one embodiment, the criteria based digital map data is searched based, at least in part, on the one or more user route criteria and one or more potential routes are determined that most closely match the one or more user route criteria. In one embodiment, one or more user criteria based maps and/or sets of directions are generated associated with the one or more potential routes that most closely match the one or more user route criteria. In one embodiment, data representing the one or more user criteria based maps and/or sets of directions is then provided to the user.

Figure 2:
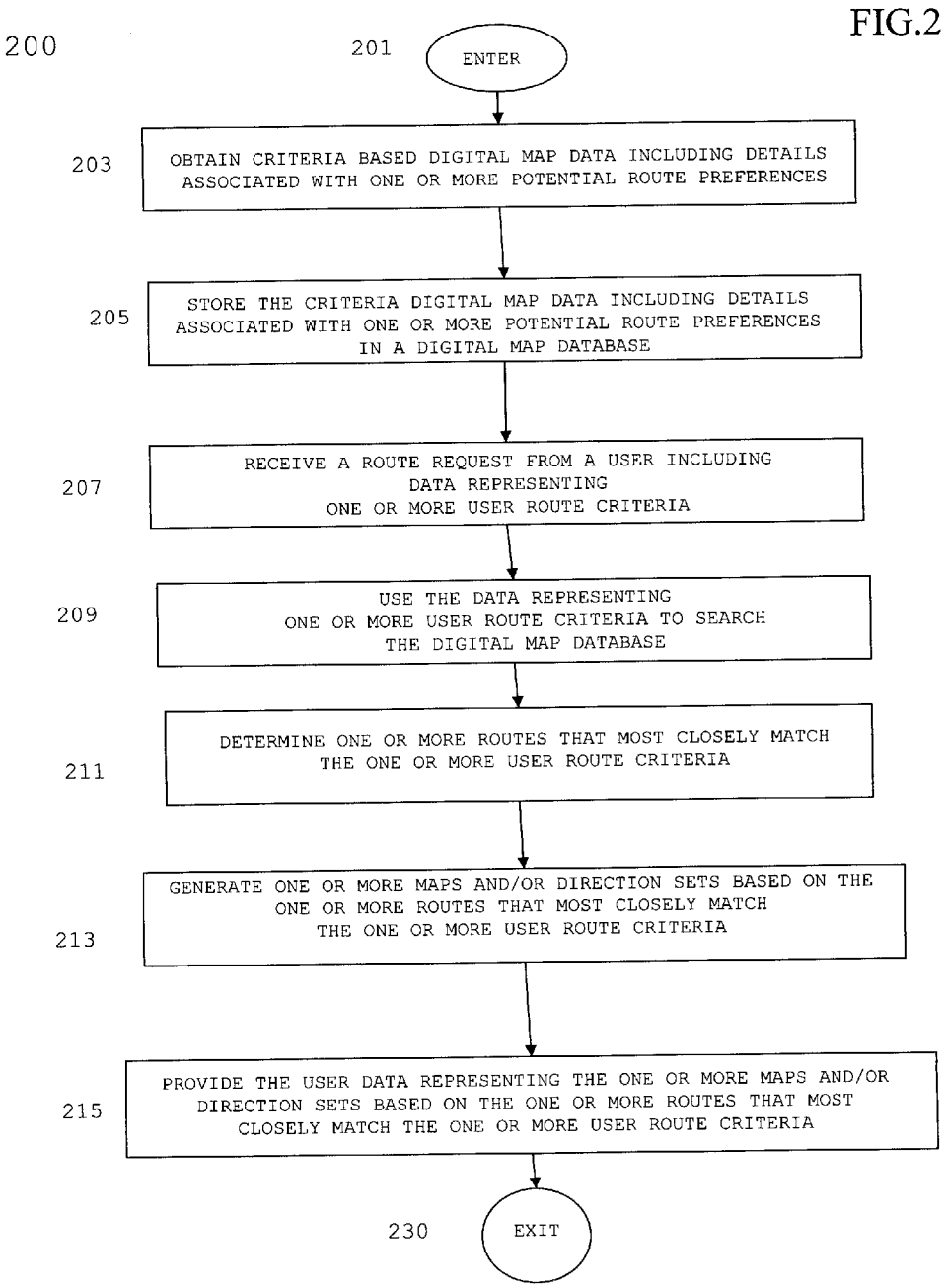
FIG. 2 is a flow chart depicting a process for providing user preference based route calculation in accordance with one embodiment.

FIG. 2 a flow chart depicting a process for providing user preference based route calculation 200 in accordance with one embodiment. Process for providing user preference based route calculation 200 begins at ENTER OPERATION 201 of FIG. 2 and process flow proceeds to OBTAIN CRITERIA BASED DIGITAL MAP DATA INCLUDING DETAILS ASSOCIATED WITH ONE OR MORE POTENTIAL ROUTE PREFERENCES OPERATION 203.

In one embodiment, at OBTAIN CRITERIA BASED DIGITAL MAP DATA INCLUDING DETAILS ASSOCIATED WITH ONE OR MORE POTENTIAL ROUTE PREFERENCES OPERATION 203 criteria based digital map data is generated and/or obtained.

In one embodiment, the criteria based digital map data is generated and/or obtained at OBTAIN CRITERIA BASED DIGITAL MAP DATA INCLUDING DETAILS ASSOCIATED WITH ONE OR MORE POTENTIAL ROUTE PREFERENCES OPERATION 203 using any one or several processes, mechanisms, and/or sources, as discussed herein, and/or known in the art at the time of filing, and/or as developed after the time of filing.

For instance, in one embodiment, at OBTAIN CRITERIA BASED DIGITAL MAP DATA INCLUDING DETAILS ASSOCIATED WITH ONE OR MORE POTENTIAL ROUTE PREFERENCES OPERATION 203, the criteria based digital map data is obtained by human/field observation and/or data gathering. In one embodiment, the criteria based digital map data obtained by human/field observation and/or data gathering is then entered into a computing system, such as computing systems 100 and/or 150 of FIG. 1, using a user interface device such as a keyboard 107, 157, a mouse 111, 161, and a display device 115, 165, and/or, one or more standard input/output (I/O) devices 113, 163, such as a compact disk (CD) or DVD drive, floppy disk drive, or other digital or waveform port, or other device capable of inputting data to, and outputting data from, a computing system, whether available or known at the time of filing or as later developed.

Returning to FIG. 2, in one embodiment, at OBTAIN CRITERIA BASED DIGITAL MAP DATA INCLUDING DETAILS ASSOCIATED WITH ONE OR MORE POTENTIAL ROUTE PREFERENCES OPERATION 203, the criteria based digital map data is obtained from printed materials, such as a traditional map, and then entered into a computing system using a user interface device and/or a scanning device.

In one embodiment, at OBTAIN CRITERIA BASED DIGITAL MAP DATA INCLUDING DETAILS ASSOCIATED WITH ONE OR MORE POTENTIAL ROUTE PREFERENCES OPERATION 203, the criteria based digital map data is obtained from and/or is based on, information obtained by process for providing user preference based route calculation 200 from web-sites and/or display screens using screen scraping technology, and/or any similar data gathering technology, whether known at the time of filing or as developed thereafter.

In one embodiment, at OBTAIN CRITERIA BASED DIGITAL MAP DATA INCLUDING DETAILS ASSOCIATED WITH ONE OR MORE POTENTIAL ROUTE PREFERENCES OPERATION 203, the criteria based digital map data is obtained from existing map data already in a digital format. The data is then transferred to a computing system, such as computing systems 100 and/or 150 of FIG. 1, using a user interface device and/or one or more standard input/output (I/O) devices, such as a compact disk (CD) or DVD drive, floppy disk drive, or other digital or waveform port, and/or a computer program product, as defined herein, or other device capable of inputting data to, and outputting data from, a computing system, whether available or known at the time of filing or as later developed.

Returning to FIG. 2, in other embodiments, at OBTAIN CRITERIA BASED DIGITAL MAP DATA INCLUDING DETAILS ASSOCIATED WITH ONE OR MORE POTENTIAL ROUTE PREFERENCES OPERATION 203, the criteria based digital map data is obtained from any source of criteria based digital map data as discussed herein, and/or known in the art at the time of filing, and/or as developed after the time of filing and transferred via any means, mechanism, method, process, procedure, or device for providing, transferring and/or accessing data, whether known at the time of filing or as developed thereafter.

In one embodiment the criteria based digital map data obtained at OBTAIN CRITERIA BASED DIGITAL MAP DATA INCLUDING DETAILS ASSOCIATED WITH ONE OR MORE POTENTIAL ROUTE PREFERENCES OPERATION 203 includes, but is not limited to, data associated with one or more user criteria that are offered, in one embodiment, to the user by the process for providing user preference based route calculation as user selectable route preferences. Consequently, in one embodiment, at OBTAIN CRITERIA BASED DIGITAL MAP DATA INCLUDING DETAILS ASSOCIATED WITH ONE OR MORE POTENTIAL ROUTE PREFERENCES OPERATION 203, the criteria based digital map data includes detailed data that is not typically associated with currently available digital map data, such as data indicating, but not limited to, one or more of the following: the number and/or availability of right or left turns; designated business routes; stop signs and/or traffic lights; designated right and/or left turn lanes and traffic lights; speed limits; number of traffic lanes; major metropolitan areas; changes in elevation; and/or any other criteria based digital map data desired.

In one embodiment, once criteria based digital map data is generated and/or obtained at OBTAIN CRITERIA BASED DIGITAL MAP DATA INCLUDING DETAILS ASSOCIATED WITH ONE OR MORE POTENTIAL ROUTE PREFERENCES OPERATION 203, process flow proceeds to STORE THE CRITERIA BASED DIGITAL MAP DATA INCLUDING DETAILS ASSOCIATED WITH ONE OR MORE POTENTIAL ROUTE PREFERENCES IN A DIGITAL MAP DATABASE OPERATION 205.

In one embodiment, at STORE THE CRITERIA BASED DIGITAL MAP DATA INCLUDING DETAILS ASSOCIATED WITH ONE OR MORE POTENTIAL ROUTE PREFERENCES IN A DIGITAL MAP DATABASE OPERATION 205 at least part of the criteria based digital map data of OBTAIN CRITERIA BASED DIGITAL MAP DATA INCLUDING DETAILS ASSOCIATED WITH ONE OR MORE POTENTIAL ROUTE PREFERENCES OPERATION 203 is stored; In one embodiment, in a digital map data database.

In one embodiment, at STORE THE CRITERIA BASED DIGITAL MAP DATA INCLUDING DETAILS ASSOCIATED WITH ONE OR MORE POTENTIAL ROUTE PREFERENCES IN A DIGITAL MAP DATABASE OPERATION 205 at least part of the criteria based digital map data of OBTAIN CRITERIA BASED DIGITAL MAP DATA INCLUDING DETAILS ASSOCIATED WITH ONE OR MORE POTENTIAL ROUTE PREFERENCES OPERATION 203 is stored in a digital map data database that is local, remote, or a combination of local and remote, to a computing system implementing process for providing user preference based route calculation 200.

In one embodiment, at STORE THE CRITERIA BASED DIGITAL MAP DATA INCLUDING DETAILS ASSOCIATED WITH ONE OR MORE POTENTIAL ROUTE PREFERENCES IN A DIGITAL MAP DATABASE OPERATION 205 at least part of the criteria based digital map data of OBTAIN CRITERIA BASED DIGITAL MAP DATA INCLUDING DETAILS ASSOCIATED WITH ONE OR MORE POTENTIAL ROUTE PREFERENCES OPERATION 203 is stored in a digital map data database that is a memory associated with, that is part of, or is accessible by, one or more computing system implemented map and route calculation systems.

Returning to FIG. 2, in one embodiment, the digital map data database of STORE THE CRITERIA BASED DIGITAL MAP DATA INCLUDING DETAILS ASSOCIATED WITH ONE OR MORE POTENTIAL ROUTE PREFERENCES IN A DIGITAL MAP DATABASE OPERATION 205 includes a data storage device, such one or more of databases 170, 171 and/or 172 of FIG. 1, a server system, such as server system 120 of FIG. 1, a computing system, such as computing systems 100 and/or 150 of FIG. 1, and/or a designated portion of one or more server systems or computing systems, or a distributed database, or an external and/or portable hard drive, or any combination thereof, that is local, remote, or a combination of local and remote, to a computing system implementing process for providing user preference based route calculation 200.

Returning to FIG. 2, in one embodiment, the digital map data database of STORE THE CRITERIA BASED DIGITAL MAP DATA INCLUDING DETAILS ASSOCIATED WITH ONE OR MORE POTENTIAL ROUTE PREFERENCES IN A DIGITAL MAP DATABASE OPERATION 205 includes a dedicated mass storage device implemented in software, hardware, or a combination of hardware and software. In one embodiment, the digital map data database includes a web-based function accessible through a private and/or public network, such as network 130 of FIG. 1.

Returning to FIG. 2, in one embodiment, the digital map data database of STORE THE CRITERIA BASED DIGITAL MAP DATA INCLUDING DETAILS ASSOCIATED WITH ONE OR MORE POTENTIAL ROUTE PREFERENCES IN A DIGITAL MAP DATABASE OPERATION 205 is accessible through a private and/or public network, such as network 130 of FIG. 1, and/or an Internet connection. In one embodiment, the digital map data database is accessible through a wireless connection and/or network, such as network 130 of FIG. 1.

Returning to FIG. 2, in one embodiment, the digital map data database of STORE THE CRITERIA BASED DIGITAL MAP DATA INCLUDING DETAILS ASSOCIATED WITH ONE OR MORE POTENTIAL ROUTE PREFERENCES IN A DIGITAL MAP DATABASE OPERATION 205 is accessible using a computing system such as a computing system implemented map and route calculation system, a desktop computer, a laptop computer, a hand held computer, any portable computer, a workstation, a two-way pager, a cellular telephone, a smart phone, a digital wireless telephone, a Personal Digital Assistant (PDA), a server computer, an Internet appliance, or any other device, or any desired combination of these devices.

In one embodiment, at least part of the criteria based digital map data of OBTAIN CRITERIA BASED DIGITAL MAP DATA INCLUDING DETAILS ASSOCIATED WITH ONE OR MORE POTENTIAL ROUTE PREFERENCES OPERATION 203 stored, in one embodiment, in a digital map data database, at STORE THE CRITERIA BASED DIGITAL MAP DATA INCLUDING DETAILS ASSOCIATED WITH ONE OR MORE POTENTIAL ROUTE PREFERENCES IN A DIGITAL MAP DATABASE OPERATION 205 is updated periodically on scheduled intervals, as the data changes, or in both instances.

In one embodiment, once at least part of the criteria based digital map data of OBTAIN CRITERIA BASED DIGITAL MAP DATA INCLUDING DETAILS ASSOCIATED WITH ONE OR MORE POTENTIAL ROUTE PREFERENCES OPERATION 203 is stored, in one embodiment, in a digital map data database, at STORE THE CRITERIA BASED DIGITAL MAP DATA INCLUDING DETAILS ASSOCIATED WITH ONE OR MORE POTENTIAL ROUTE PREFERENCES IN A DIGITAL MAP DATABASE OPERATION 205, process flow proceeds to RECEIVE A ROUTE REQUEST FROM A USER INCLUDING DATA REPRESENTING ONE OR MORE USER ROUTE CRITERIA OPERATION 207.

In one embodiment, at RECEIVE A ROUTE REQUEST FROM A USER INCLUDING DATA REPRESENTING ONE OR MORE USER ROUTE CRITERIA OPERATION 207 a user makes a request for a map and/or directions from a first point to a second point and, in one embodiment, the user request for a map and/or directions also includes one or more user route criteria.

In one embodiment, at RECEIVE A ROUTE REQUEST FROM A USER INCLUDING DATA REPRESENTING ONE OR MORE USER ROUTE CRITERIA OPERATION 207 a user initiates a map and/or directions search request for a map and/or directions from a first point to a second point using a user interface device associated with a computing system implemented map and route calculation system such as a keyboard, mouse, touch pad, voice recognition software, or any other means and/or mechanism for converting user actions into computing system processes, as discussed herein, and/or known in the art at the time of filing, and/or as developed after the time of filing, and/or using any other means for entering data into a computing system implementing at least part of process for providing user preference based route calculation 200.

In one embodiment, at RECEIVE A ROUTE REQUEST FROM A USER INCLUDING DATA REPRESENTING ONE OR MORE USER ROUTE CRITERIA OPERATION 207, the user initiates a map and/or directions search request through a computing system, such as computing systems 100 and/or 150 of FIG. 1. As noted above, herein a computing system can be, but is not limited to: a computing system implemented map and route calculation system; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computing system implemented map and route calculation systems; computers; wireless devices; cellular telephones; digital telephones; two-way pagers; PDAs; media players; server computers; or any desired combination of these devices, that are coupled to perform the processes and/or operations as described herein.

In one embodiment, at RECEIVE A ROUTE REQUEST FROM A USER INCLUDING DATA REPRESENTING ONE OR MORE USER ROUTE CRITERIA OPERATION 207, the user initiates a map and/or directions search request via a mobile computing system which includes all or part of the criteria based digital map data of OBTAIN CRITERIA BASED DIGITAL MAP DATA INCLUDING DETAILS ASSOCIATED WITH ONE OR MORE POTENTIAL ROUTE PREFERENCES OPERATION 203.

In one embodiment, at RECEIVE A ROUTE REQUEST FROM A USER INCLUDING DATA REPRESENTING ONE OR MORE USER ROUTE CRITERIA OPERATION 207, the user initiates a map and/or directions search request via connection to a network, such as network 130 of FIG. 1. As noted above, in one embodiment, network 130 can be any network or network system that is of interest to a user such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

As noted above, in one embodiment, at RECEIVE A ROUTE REQUEST FROM A USER INCLUDING DATA REPRESENTING ONE OR MORE USER ROUTE CRITERIA OPERATION 207, the map and/or directions search request initiated by the user includes one or more user route criteria.

In one embodiment, the one or more user route criteria include, but are not limited to, the user route criterion that the desired route be the most fuel efficient route, or a green route. In one embodiment, the most fuel efficient route, or a green route, is a route that involves the user's engine using the least amount of energy. In some instances, this could mean the route with the least amount of time waiting in traffic and/or at stop lights. In some instances, the most fuel efficient route, or a green route, is the route that includes speed limits most conducive to fuel efficiency. In some instances, the most fuel efficient route, or a green route, is the route that gets the user to the specified point over the most level terrain. In some instances, the most fuel efficient route, or a green route, is the route that simply results in the user's engine running the least amount of time.

In one embodiment, the one or more user route criteria include, but are not limited to, the user route criterion that the desired route is the route with most right, or left, hand turns and/or the route with the least left, or right, hand turns. This user route criterion is particularly useful in areas where one type of turn, say a right turn, can be made even on a red light, while another type of turn, such as left turn, cannot. Consequently, in these instances, using the user route criterion that the desired route be the route with most right, or left, hand turns and/or the routes with the least left, or right, hand turns, the user can avoid waiting at traffic lights for signals to change, this also will tend to reduce gridlock in urban areas.

In one embodiment, the one or more user route criteria include, but are not limited to, the user route criterion that the desired route is the route with most, or least, traffic signals including right, or left, hand signals and/or the route with the most, or least, designated left, or right, hand turn lanes.

In one embodiment, the one or more user route criteria include, but are not limited to, the user route criterion that the desired route be a route avoiding, or incorporating, designated business routes. In this instance, the user may wish to either avoid business routes, and business route issues such as trucks, or the user may be a truck and desire to use only business routes.

In one embodiment, the one or more user route criteria include, but are not limited to, the user route criterion that the desired route be a route avoiding, or incorporating, stop signs as opposed to traffic lights.

In one embodiment, the one or more user route criteria include, but are not limited to, the user route criterion that the desired route be a route having specified maximum or minimum speed limits.

In one embodiment, the one or more user route criteria include, but are not limited to, the user route criterion that the desired route be a route having a specified number of traffic lanes in either direction, thereby avoiding bottlenecks, or avoiding large highways.

In one embodiment, the one or more user route criteria include, but are not limited to, the user route criterion that the desired route be a route avoiding, or passing through, major metropolitan areas.

In one embodiment, the one or more user route criteria include, but are not limited to, the user route criterion that the desired route be a route avoiding, or incorporating, specified changes in elevation. In this instance, the user may wish to avoid hills, either for fuel economy or perhaps even to compensate for older brakes. On the other hand the user may desire hills, and the associated views, or wish to avoid valleys in the event of flood concerns.

In other embodiments, the one or more user route criteria include, but are not limited to, any combination of the above user route criteria and/or any other user route criteria of interest to the user.

In one embodiment, once a user makes a request for a map and/or directions from a first point to a second point and includes one or more user route criteria at RECEIVE A ROUTE REQUEST FROM A USER INCLUDING DATA REPRESENTING ONE OR MORE USER ROUTE CRITERIA OPERATION 207, process flow proceeds to USE THE DATA REPRESENTING ONE OR MORE USER ROUTE CRITERIA TO SEARCH THE DIGITAL MAP DATABASE OPERATION 209.

In one embodiment, at USE THE DATA REPRESENTING ONE OR MORE USER ROUTE CRITERIA TO SEARCH THE DIGITAL MAP DATABASE OPERATION 209 the criteria based digital map data is searched based, at least in part, on the one or more user route criteria.

In one embodiment, at USE THE DATA REPRESENTING ONE OR MORE USER ROUTE CRITERIA TO SEARCH THE DIGITAL MAP DATABASE OPERATION 209, in response to the user request for a map and/or directions from a first point to a second point including the one or more user route criteria of RECEIVE A ROUTE REQUEST FROM A USER INCLUDING DATA REPRESENTING ONE OR MORE USER ROUTE CRITERIA OPERATION 207, the criteria based digital map data obtained at OBTAIN CRITERIA BASED DIGITAL MAP DATA INCLUDING DETAILS ASSOCIATED WITH ONE OR MORE POTENTIAL ROUTE PREFERENCES OPERATION 203, and stored at STORE THE CRITERIA BASED DIGITAL MAP DATA INCLUDING DETAILS ASSOCIATED WITH ONE OR MORE POTENTIAL ROUTE PREFERENCES IN A DIGITAL MAP DATABASE OPERATION 205 is searched based, at least in part, on the one or more user route criteria of RECEIVE A ROUTE REQUEST FROM A USER INCLUDING DATA REPRESENTING ONE OR MORE USER ROUTE CRITERIA OPERATION 207.

In one embodiment, at USE THE DATA REPRESENTING ONE OR MORE USER ROUTE CRITERIA TO SEARCH THE DIGITAL MAP DATABASE OPERATION 209, the search of the criteria based digital map data of STORE THE CRITERIA BASED DIGITAL MAP DATA INCLUDING DETAILS ASSOCIATED WITH ONE OR MORE POTENTIAL ROUTE PREFERENCES IN A DIGITAL MAP DATABASE OPERATION 205 is performed using any one of several search mechanisms, programs, procedures, and/or algorithms as described herein, and/or known in the art at the time of filing, and/or as developed after the time of filing.

In one embodiment, once the criteria based digital map data is searched based, at least in part, on the one or more user route criteria at USE THE DATA REPRESENTING ONE OR MORE USER ROUTE CRITERIA TO SEARCH THE DIGITAL MAP DATABASE OPERATION 209, process flow proceeds to DETERMINE ONE OR MORE ROUTES THAT MOST CLOSELY MATCH THE ONE OR MORE USER ROUTE CRITERIA OPERATION 211.

In one embodiment, at DETERMINE ONE OR MORE ROUTES THAT MOST CLOSELY MATCH THE ONE OR MORE USER ROUTE CRITERIA OPERATION 211, based on the search of the criteria based digital map data performed at USE THE DATA REPRESENTING ONE OR MORE USER ROUTE CRITERIA TO SEARCH THE DIGITAL MAP DATABASE OPERATION 209, one or more potential routes are determined that most closely match the one or more user route criteria of RECEIVE A ROUTE REQUEST FROM A USER INCLUDING DATA REPRESENTING ONE OR MORE USER ROUTE CRITERIA OPERATION 207.

In one embodiment, once one or more potential routes are determined that most closely match the one or more user route criteria at DETERMINE ONE OR MORE ROUTES THAT MOST CLOSELY MATCH THE ONE OR MORE USER ROUTE CRITERIA OPERATION 211, process flow proceeds to GENERATE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 213.

In one embodiment, at GENERATE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 213 data representing one or more user criteria based maps and/or sets of directions is generated that is associated with the one or more potential routes that most closely match the one or more user route criteria.

In one embodiment, at GENERATE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 213, data representing one or more user criteria based maps and/or sets of directions are generated for the one or more potential routes that most closely match the one or more user route criteria of DETERMINE ONE OR MORE ROUTES THAT MOST CLOSELY MATCH THE ONE OR MORE USER ROUTE CRITERIA OPERATION 211 along with supporting data indicating how closely the route matches the one or more user route criteria.

In one embodiment, at GENERATE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 213, data representing two or more potential routes that most closely match the one or more user route criteria of RECEIVE A ROUTE REQUEST FROM A USER INCLUDING DATA REPRESENTING ONE OR MORE USER ROUTE CRITERIA OPERATION 207 are generated along with supporting data indicating how closely each route matches the one or more user route criteria.

In one embodiment, at GENERATE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 213, data representing two or more potential routes that most closely match the one or more user route criteria of RECEIVE A ROUTE REQUEST FROM A USER INCLUDING DATA REPRESENTING ONE OR MORE USER ROUTE CRITERIA OPERATION 207 are generated along with supporting data representing a ranking of the proposed routes according to how closely each route matches the one or more user route criteria.

In one embodiment, once data representing two or more potential routes that most closely match the one or more user route criteria of RECEIVE A ROUTE REQUEST FROM A USER INCLUDING DATA REPRESENTING ONE OR MORE USER ROUTE CRITERIA OPERATION 207 are generated along with supporting data at GENERATE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 213, process flow proceeds to PROVIDE THE USER DATA REPRESENTING THE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 215.

In one embodiment, at PROVIDE THE USER DATA REPRESENTING THE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 215 the data representing the one or more user criteria based maps and/or sets of directions is provided to the user.

In one embodiment, at PROVIDE THE USER DATA REPRESENTING THE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 215 the data representing the one or more user criteria based maps and/or sets of directions, and/or any supporting data, of GENERATE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 213 is provided to the user.

In one embodiment, at PROVIDE THE USER DATA REPRESENTING THE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 215 the data representing the one or more user criteria based maps and/or sets of directions, and/or any supporting data, of GENERATE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 213 is provided to the user through one or more computing system implemented map and route calculation systems.

In one embodiment, at PROVIDE THE USER DATA REPRESENTING THE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 215 the data representing the one or more user criteria based maps and/or sets of directions, and/or any supporting data, of GENERATE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 213 is provided to the user via a computing system, such as computing systems 100 and/or 150 of FIG. 1. As noted above, herein a computing system can be, but is not limited to: a computing system implemented map and route calculation system; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computing system implemented map and route calculation systems; computers; wireless devices; cellular telephones; digital telephones; two-way pagers; PDAs; media players; server computers; or any desired combination of these devices, that are coupled to perform the processes and/or operations as described herein.

In one embodiment, at PROVIDE THE USER DATA REPRESENTING THE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 215 the data representing the one or more user criteria based maps and/or sets of directions, and/or any supporting data, of GENERATE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 213 is provided to the user via a mobile computing system which includes all or part of the criteria based digital map data of OBTAIN CRITERIA BASED DIGITAL MAP DATA INCLUDING DETAILS ASSOCIATED WITH ONE OR MORE POTENTIAL ROUTE PREFERENCES OPERATION 203.

In one embodiment, at PROVIDE THE USER DATA REPRESENTING THE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 215 the data representing the one or more user criteria based maps and/or sets of directions, and/or any supporting data, of GENERATE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 213 is provided to the user via connection to a network, such as network 130 of FIG. 1. As noted above, in one embodiment, network 130 can be any network or network system that is of interest to a user such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

Returning to FIG. 2, in one embodiment, at PROVIDE THE USER DATA REPRESENTING THE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 215 the data representing the one or more user criteria based maps and/or sets of directions, and/or any supporting data, of GENERATE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 213 is provided to the user by providing the user access to the data in a data storage device, such as one or more of databases 170, 171 and/or 172 of FIG. 1, or a designated portion of one or more server systems or computing systems, or a distributed database, or an external and/or portable hard drive, or any combination thereof, that is local, remote, or a combination of local and remote.

Returning to FIG. 2, in one embodiment, at PROVIDE THE USER DATA REPRESENTING THE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 215 the data representing the one or more user criteria based maps and/or sets of directions, and/or any supporting data, of GENERATE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 213 is provided to the user through software, hardware, or a combination of hardware and software.

In one embodiment, at PROVIDE THE USER DATA REPRESENTING THE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 215 the data representing the one or more user criteria based maps and/or sets of directions, and/or any supporting data, of GENERATE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 213 is provided to the user using a computer program product, as defined herein.

In one embodiment, at PROVIDE THE USER DATA REPRESENTING THE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 215 the data representing the one or more user criteria based maps and/or sets of directions, and/or any supporting data, of GENERATE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 213 is provided to the user through a web-based function accessible through a private and/or public network.

In one embodiment, at PROVIDE THE USER DATA REPRESENTING THE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 215 the data representing the one or more user criteria based maps and/or sets of directions, and/or any supporting data, of GENERATE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 213 is provided to the user through a private and/or public network, and/or an Internet connection.

In one embodiment, at PROVIDE THE USER DATA REPRESENTING THE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 215 the data representing the one or more user criteria based maps and/or sets of directions, and/or any supporting data, of GENERATE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 213 is provided to the user through a wireless network.

In one embodiment, at PROVIDE THE USER DATA REPRESENTING THE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 215 the data representing the one or more user criteria based maps and/or sets of directions, and/or any supporting data, of GENERATE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 213 is provided to the user via any means, mechanism, method, process, procedure, or device for providing a user information and/or data, as discussed herein, and/or as known in the art at the time of filing, and/or as developed after the time of filing.

In one embodiment, once the data representing the one or more user criteria based maps and/or sets of directions, and/or any supporting data, of GENERATE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 213 is provided to the user at PROVIDE THE USER DATA REPRESENTING THE ONE OR MORE MAPS AND/OR DIRECTION SETS BASED ON THE ONE OR MORE ROUTES THAT MOST CLOSELY MATCH THE ONE OR MORE USER ROUTE CRITERIA OPERATION 215, process flow proceeds to EXIT OPERATION 230.

In one embodiment, at EXIT OPERATION 230 process for providing user preference based route calculation 200 is exited to await new data and/or another search request.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for providing user preference based route calculation 200, the capabilities of computing system implemented map and route calculation systems is greatly increased as the user is provided significant ability to designate route preferences. For instance, using process for providing user preference based route calculation 200, the user has the opportunity to customize the suggested route to include secondary, but often very significant, route considerations such as the most fuel efficient route, routes avoiding or incorporating designated business routes, routes avoiding or incorporating stop signs as opposed to traffic lights, routes having specified speed limits, routes having a specified number of traffic lanes, routes avoiding or incorporating, major metropolitan areas, routes avoiding, or incorporating, specified changes in elevation, etc. Consequently, using process for providing user preference based route calculation 200, the user is presented numerous opportunities to save fuel and/or time and the opportunity to choose a route that is best suited to the user's needs, and which would result in the most pleasant travel experience for the user.

As discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining", "receiving" "initiating", "using", "identifying", "determining", "accessing", "obtaining", "generating", "storing", "providing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated most closely meeting mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system for providing user preference based route calculation comprising:
    one or more processors; and
    one or more memories, the individual ones of the one or more memories coupled to individual ones of the one or more processors, the one or more memories having instructions stored therein which when executed by the one or more processors, perform a process comprising:
    obtaining criteria based digital map data, the criteria based digital map data including details associated with one or more potential user route criteria;
    storing the criteria based digital map data;
    a user initiating a map and/or directions search request, the user initiated map and/or directions search request including one or more user route criteria;
    in response to the user initiated map and/or directions search request, searching the criteria based digital map data for one or more proposed routes that match, or most closely match, at least part of the one or more user route criteria, the process being operable to consider individual user route criteria including a minimum speed limit and a maximum speed limit, to maximize a number of stop signs and minimize a number of stop lights, to minimize a number of stop signs and maximize a number of stop lights, to include or exclude areas susceptible to floods, minimizing the amount of energy used by an engine of the user, and speed limits most conducive to fuel efficiency, based on whether the user route criteria includes individual ones of those criteria;
    generating data representing one or more maps and/or sets of directions based on the one or more proposed routes that match, or most closely match, at least part of the one or more user route criteria; and
    providing the user with the data representing one or more maps and/or sets of directions, the provided data being based on the one or more proposed routes that match, or most closely match, at least part of the one or more user route criteria.

2. The computing system for providing user preference based route calculation of claim 1, wherein;
    the details associated with one or more potential user route criteria comprise details associated with one or more potential user route criteria selected from the group of details associated with one or more potential user route criteria consisting of:
    the number and/or availability of right or left turns;
    designated business routes;
    traffic lights;
    designated right and/or left turn lanes;
    designated right and/or left turn traffic lights;
    number of traffic lanes;
    major metropolitan areas; and
    changes in elevation.

3. The computing system for providing user preference based route calculation of claim 1, wherein;
    the criteria based digital map data is stored in a memory accessible by a computing system implemented map and route calculation system.

4. The computing system for providing user preference based route calculation of claim 1, wherein;
    the criteria based digital map data is stored in a network-based database accessible by a computing system implemented map and route calculation system.

5. The computing system for providing user preference based route calculation of claim 1, wherein;
    the criteria based digital map data is stored in a network-accessible database accessible by a computing system implemented map and route calculation system coupled to the network.

6. The computing system for providing user preference based route calculation of claim 1, wherein;
    the user initiates a map and/or directions search request using a user interface device associated with a computing system implemented map and route calculation system.

7. The computing system for providing user preference based route calculation of claim 1, wherein;
    the one or more user route criteria include at least one user route criterion selected from the group of user route criteria consisting of:
    the route with most right or left hand turns;
    the route with the least right or left hand turns;
    a route avoiding, or incorporating, designated business routes;

a route having a specified number of traffic lanes;

a route avoiding, or incorporating, major metropolitan areas; and a route avoiding, or incorporating, specified changes in elevation.

8. The computing system for providing user preference based route calculation of claim 1, wherein;

providing the user with the data representing one or more maps and/or sets of directions, the provided data being based on the one or more proposed routes that match, or most closely match, at least part of the one or more user route criteria comprises providing the user with the data representing one or more maps and/or sets of directions, the provided data being based on the one or more proposed routes that match, or most closely match, at least part of the one or more user route criteria and supporting data indicating how closely the one or more proposed routes match at least part of the one or more user route criteria.

9. The computing system for providing user preference based route calculation of claim 1, wherein;

providing the user with the data representing one or more maps and/or sets of directions, the provided data being based on the one or more proposed routes that match, or most closely match, at least part of the one or more user route criteria comprises providing the user with the data representing two or more maps and/or sets of directions, the provided data being based on the one or more proposed routes that match, or most closely match, at least part of the one or more user route criteria and supporting data ranking the two or more proposed routes based, at least in part, on how closely each of the two or more proposed routes match at least part of the one or more user route criteria.

10. The computing system for providing user preference based route calculation of claim 1, wherein;

the user is provided with the data representing one or more maps and/or sets of directions based on the one or more proposed routes that match, or most closely match, at least part of the one or more user route criteria through a computing system implemented map and route calculation system.

11. A computer program product for providing a user preference based route calculation comprising:

a nontransitory computer readable medium;

and computer program code, encoded on the computer readable medium, comprising computer readable instructions for:

obtaining criteria based digital map data, the criteria based digital map data including details associated with one or more potential user route criteria;

storing the criteria based digital map data;

providing a user the ability to initiate a map and/or directions search request, the user initiated map and/or directions search request including one or more user route criteria;

in response to the user initiated map and/or directions search request, searching the criteria based digital map data for one or more proposed routes that match, or most closely match, at least part of the one or more user route criteria, the process being operable to consider individual user route criteria including a minimum speed limit and a maximum speed limit, to maximize a number of stop signs and minimize a number of stop lights, to minimize a number of stop signs and maximize a number of stop lights, to include or exclude areas susceptible to floods, minimizing the amount of energy used by an engine of the user, and speed limits most conducive to fuel efficiency, based on whether the user route criteria includes individual ones of those criteria;

generating data representing one or more maps and/or sets of directions based on the one or more proposed routes that match, or most closely match, at least part of the one or more user route criteria; and providing the user with the data representing one or more maps and/or sets of directions based on the one or more proposed routes that match, or most closely match, at least part of the one or more user route criteria.

12. The computer program product for providing a user preference based route calculation of claim 11, wherein;

the details associated with one or more potential user route criteria comprise details associated with one or more potential user route criteria selected from the group of details associated with one or more potential user route criteria consisting of:

the number and/or availability of right or left turns;

designated business routes;

traffic lights;

designated right and/or left turn lanes;

designated right and/or left turn traffic lights;

number of traffic lanes;

major metropolitan areas; and changes in elevation.

13. The computer program product for providing a user preference based route calculation of claim 11, wherein;

the criteria based digital map data is stored in a memory accessible by a computing system implemented map and route calculation system.

14. The computer program product for providing a user preference based route calculation of claim 11, wherein;

the criteria based digital map data is stored in a network-based database accessible by a computing system implemented map and route calculation system.

15. The computer program product for providing a user preference based route calculation of claim 11, wherein;

the criteria based digital map data is stored in a network-accessible database accessible by a computing system implemented map and route calculation system coupled to the network.

16. The computer program product for providing a user preference based route calculation of claim 11, wherein;

the user initiates a map and/or directions search request using a user interface device associated with a computing system implemented map and route calculation system.

17. The computer program product for providing a user preference based route calculation of claim 11, wherein;

the one or more user route criteria include at least one user route criterion selected from the group of user route criteria consisting of:

the route with most right or left hand turns;

the route with the least right or left hand turns;

a route avoiding, or incorporating, designated business routes;

a route having a specified number of traffic lanes;

a route avoiding, or incorporating, major metropolitan areas; and a route avoiding, or incorporating, specified changes in elevation.

18. The computer program product for providing a user preference based route calculation of claim 11, wherein;

providing the user with the data representing one or more maps and/or sets of directions, the provided data being based on the one or more proposed routes that match, or most closely match, at least part of the one or more user route criteria comprises providing the user with the data representing one or more maps and/or sets of directions, the provided data being based on the one or more proposed routes that match, or most closely match, at least part of the one or more user route criteria and supporting data indicating how closely the one or more proposed routes match at least part of the one or more user route criteria.

19. The computer program product for providing a user preference based route calculation of claim 11, wherein;

providing the user with the data representing one or more maps and/or sets of directions, the provided data being based on the one or more proposed routes that match, or most closely match, at least part of the one or more user route criteria comprises providing the user with the data representing two or more maps and/or sets of directions, the provided data being based on the one or more proposed routes that match, or most closely match, at least part of the one or more user route criteria and supporting data ranking the two or more proposed routes based, at least in part, on how closely each of the two or more proposed routes match at least part of the one or more user route criteria.

20. The computer program product for providing a user preference based route calculation of claim 11, wherein;

the user is provided with the data representing one or more maps and/or sets of directions based on the one or more proposed routes that match, or most closely match, at least part of the one or more user route criteria through a computing system implemented map and route calculation system.

21. A system for providing a user preference based route calculation comprising:

a computing system implemented map and route calculation system comprising a processor for executing a process for providing user preference based route calculation, the process for providing user preference based route calculation comprising:

obtaining criteria based digital map data, the criteria based digital map data including details associated with one or more potential user route criteria;

storing the criteria based digital map data;

receiving from a user a map and/or directions search request, the map and/or directions search request including one or more user route criteria;

in response to the map and/or directions search request, searching the criteria based digital map data for one or more proposed routes that match, or most closely match, at least part of the one or more user route criteria, the process being operable to consider individual user route criteria including a minimum speed limit and a maximum speed limit, to maximize a number of stop signs and minimize a number of stop lights, to minimize a number of stop signs and maximize a number of stop lights, to include or exclude areas susceptible to floods, minimizing the amount of energy used by an engine of the user, and speed limits most conducive to fuel efficiency, based on whether the user route criteria includes individual ones of those criteria;

generating data representing one or more maps and/or sets of directions based on the one or more proposed routes that match, or most closely match, at least part of the one or more user route criteria; and providing the user with the data representing one or more maps and/or sets of directions based on the one or more proposed routes that match, or most closely match, at least part of the one or more user route criteria.

22. The system for providing a user preference based route calculation of claim 21, wherein;

the details associated with one or more potential user route criteria comprise details associated with one or more potential user route criteria selected from the group of details associated with one or more potential user route criteria consisting of:

the number and/or availability of right or left turns;

designated business routes;

traffic lights;

designated right and/or left turn lanes;

designated right and/or left turn traffic lights;

number of traffic lanes;

major metropolitan areas; and changes in elevation.

23. The system for providing a user preference based route calculation of claim 21, wherein;

the criteria based digital map data is stored in a memory accessible by the computing system implemented map and route calculation system.

24. The system for providing a user preference based route calculation of claim 21, wherein;

the criteria based digital map data is stored in a network-based database accessible by the computing system implemented map and route calculation system.

25. The system for providing a user preference based route calculation of claim 21, wherein;

the criteria based digital map data is stored in a network-accessible database accessible by the computing system implemented map and route calculation system coupled to the network.

26. The system for providing a user preference based route calculation of claim 21, wherein;

the user initiates a map and/or directions search request using a user interface device associated with the computing system implemented map and route calculation system.

27. The system for providing a user preference based route calculation of claim 21, wherein;

the one or more user route criteria include at least one user route criterion selected from the group of user route criteria consisting of:

the route with most right or left hand turns;

the route with the least right or left hand turns;

a route avoiding, or incorporating, designated business routes;

a route having a specified number of traffic lanes;

a route avoiding, or incorporating, major metropolitan areas; and a route avoiding, or incorporating, specified changes in elevation.

28. The system for providing a user preference based route calculation of claim 21, wherein;

providing the user with the data representing one or more maps and/or sets of directions, the provided data being based on the one or more proposed routes that match, or most closely match, at least part of the one or more user route criteria comprises providing the user with the data representing one or more maps and/or sets of directions, the provided data being based on the one or more proposed routes that match, or most closely match, at least part of the one or more user route criteria and supporting data indicating how closely the one or more proposed routes match at least part of the one or more user route criteria.

29. The system for providing a user preference based route calculation of claim 21, wherein;

providing the user with the data representing one or more maps and/or sets of directions, the provided data being based on the one or more proposed routes that match, or most closely match, at least part of the one or more user route criteria comprises providing the user with the data representing two or more maps and/or sets of directions, the provided data being based on the one or more proposed routes that match, or most closely match, at least part of the one or more user route criteria and supporting data ranking the two or more proposed routes based, at least in part, on how closely each of the two or more proposed routes match at least part of the one or more user route criteria.

30. The system for providing a user preference based route calculation of claim 21, wherein;

the user is provided with the data representing one or more maps and/or sets of directions based on the one or more proposed routes that match, or most closely match, at least part of the one or more user route criteria through the computing system implemented map and route calculation system.

* * * * *